(12) United States Patent
Weinstein et al.

(10) Patent No.: US 7,906,591 B2
(45) Date of Patent: Mar. 15, 2011

(54) METHOD FOR MAKING POLYMERS

(75) Inventors: Barry Weinstein, Maple Glen, PA (US); Kenneth Bruce Laughlin, Maple Glen, PA (US); William C. Finch, Ambler, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 12/313,809

(22) Filed: Nov. 25, 2008

(65) Prior Publication Data
US 2009/0137746 A1    May 28, 2009

Related U.S. Application Data

(60) Provisional application No. 61/004,536, filed on Nov. 28, 2007.

(51) Int. Cl.
| | | |
|---|---|---|
| C08F 8/14 | (2006.01) | |
| C08F 8/00 | (2006.01) | |
| C08F 8/40 | (2006.01) | |
| C08F 19/00 | (2006.01) | |
| C08F 220/06 | (2006.01) | |
| C08L 79/06 | (2006.01) | |

(52) U.S. Cl. ............... 525/330.1; 525/330.2; 525/330.4; 525/196; 525/366; 525/384; 524/599; 524/558; 524/556

(58) Field of Classification Search ............... 525/380, 525/379, 384, 330.2, 196, 366; 524/1, 556, 524/558, 599
See application file for complete search history.

(56) References Cited

U.S. PATENT DOCUMENTS

| | | | |
|---|---|---|---|
| 5,077,361 A | 12/1991 | Hughes et al. | |
| 5,278,248 A * | 1/1994 | Egraz et al. ............... | 525/330.2 |
| 5,294,686 A | 3/1994 | Fiarman et al. | |
| 5,395,905 A * | 3/1995 | Creamer et al. ............. | 526/271 |
| 5,496,477 A | 3/1996 | Tang et al. | |
| 5,661,213 A | 8/1997 | Arkens et al. | |
| 6,174,980 B1 | 1/2001 | Hirata et al. | |
| 6,187,841 B1 | 2/2001 | Tanaka et al. | |
| 6,387,176 B1 | 5/2002 | Widmer et al. | |
| 6,846,882 B2 * | 1/2005 | Kroner et al. ............. | 525/330.1 |

FOREIGN PATENT DOCUMENTS

| | | |
|---|---|---|
| WO | WO 97/00898 | 1/1997 |

* cited by examiner

*Primary Examiner* — Ling-Siu Choi
*Assistant Examiner* — Monique Peets
(74) *Attorney, Agent, or Firm* — Andrew E.C. Merriam

(57) ABSTRACT

A method for preparing acid-containing polymers by reacting them in the presence of end-capped polyols or amines in the presence of phosphorous-containing compounds.

9 Claims, 1 Drawing Sheet

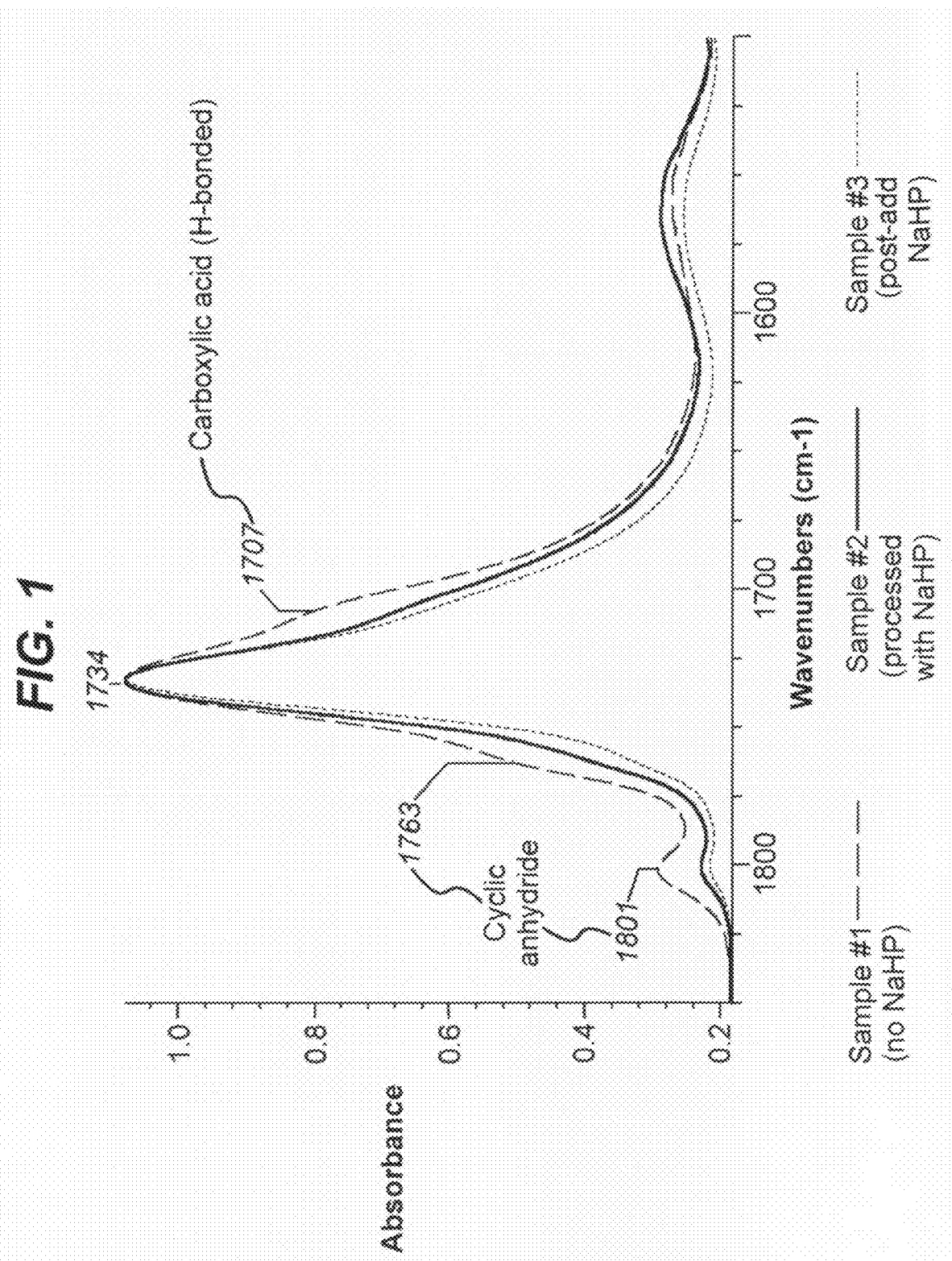

METHOD FOR MAKING POLYMERS

This application claims the benefit of priority under 35 U.S.C. §119(e) of U.S. Provisional Patent Application No. 61/004,536 filed on Nov. 28, 2007.

This invention relates to a method of making polymers that are useful as builders in detergent compositions such as, liquid cleaning formulations, industrial water treatment, pigment dispersants in coating compositions, inks, and aqueous mineral dispersions, tanning agents for leather, as associative thickeners and rheology modifiers for coatings compositions, and among other things as plasticizers for wet gypsum and/or cementitious materials.

U.S. Pat. Nos. 6,846,882 and 6,387,176 disclose processes for making super plasticizers where an end-capped polyol or amine is reacted with a polycarboxy polymer prepared with sulfur-based chain transfer agents. The problem with such polycarboxy polymers is that they emit powerful odors during and after manufacture. Particularly, in further esterification and or amidation reactions in which they are used. Sulfur residues are also corrosive to manufacturing equipment. Thus, a manufacturing alternative to the use of such polycarboxypolymers which hastens esterification and or amidation and further elimates the odiferous and corrosive properties of sulfur in the manufacture of super plasticizers would be desirable.

This invention is a process for making esterified or amidated polycarboxy polymers that can be useful from among other things as super plasticizer that comprises modifying a (co)polymer (a) containing acid groups by reacting (a) with (b)

wherein (a) is selected from one or more (co)polymer comprising at least 5% by weight of a (co)polymerized monoethylenically unsaturated monomer containing acid groups and having a weight average molecular weight from 1000 to 200,000, and (b) is selected from one or more compounds of formula I, II, III or IV

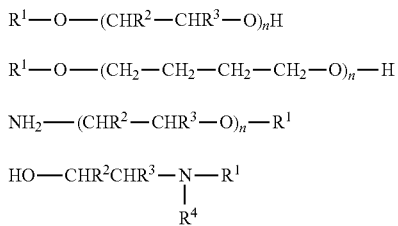

wherein $R^1$ is selected from $C_1$-$C_{50}$ alkyl; $R^2$ an $R^3$ are independently selected from H, methyl or ethyl; and $R^4$ is independently selected from $C_1$-$C_{50}$ alkyl, hydroxyethyl, acetoxyethyl, hydroxy-isopropyl, or acetoxy-isopropyl; and n is an integer from 1-230;

wherein the reaction of (a) and (b) is conducted at up to 250° C., and wherein (1) the (co)polymer(s) used as component (a) are obtained by free-radical polymerization of monoethylenically unsaturated acids in aqueous solution in the presence or absence of other monoethylenically unsaturated monomers and in the presence of at least 2% by weight, based on the monomers used in the polymerization, of a hypophosphite-containing chain transfer agent; or (2) wherein the reaction mixture of (a) and (b) further comprises a hypophosphorous acid or salt(s) thereof.

This process has favorable kinetics as compared to sulfur-based processes, and can produce a product that is substantially free of sulfur odors.

Preferably the phosphorous-containing chain transfer agent is hypophosphorous acid or one or more of its salts, such as ammonium and sodium hypophosphite or a mixture thereof.

Preferably, the phosphorous-containing chain transfer agent is used in an amount of from 4 to 20% by weight, based on the monomers used in the polymerization of (a).

Preferably (co)polymer (a) is selected from one or more homopolymers or copolymers of acrylic acid, methacrylic acid, maleic acid, iticonic acid, styrenesulfonic acid, 2-phosphoethylmethacrylate, maleic anhydride, vinylsulfonic acid, 2-acrylamido-2-methylpropanesulfonic acid, methallylsulfonic acid or alkali metal or ammonium salts of such monomers.

Preferably the reaction of (a) and (b) is conducted such that after (a) and (b) are reacted, water is added, and (a) and (b) has been reacted in proportion such that after the reaction has ended, the reaction product after water is added has a measurable amount of un-reacted acid groups remaining from (a). Unreacted acid groups can be measured by FTIR as described below.

Preferably (co)polymer (a) is selected from homopolymers of acrylic acid, homopolymers of methacrylic acid, copolymers that are made by the free radical polymerization of two or more monomers of acrylic acid and methacrylic acid, methacrylic acid and vinylsulfonic acid, acrylic acid and maleic acid, acrylic acid, methacrylic acid and maleic acid, acrylic acid and an ester of a monoethylenically unsaturated carboxylic acid, methacrylic acid and an ester of a monoethylenically unsaturated carboxylic acid and/or alkali metal or ammonium salts of the copolymers specified. Most preferably, (a) is selected from homopolymers of acrylic acid or methacrylic acid or copolymers of methacrylic acid and acrylic acid or acrylic acid and maleic acids or partial salts thereof.

Preferably the weight average molecular weight of (co)polymer (a) is from 2000 to 20,000.

Preferably, (b) is selected from methylpolyethylene glycols or methylpolyalkylene glycols comprising ethylene oxide and propylene oxide, in each case having number average molecular weights of from 200 to 10,000, or N,N-dialkyl alkanolamine.

This invention also comprises carrying out the reaction process of (a) and (b) followed by incorporating modified polymers obtained from said process in liquid cleaning formulations, industrial water treatment, pigment dispersants for coating compositions, inks, and aqueous mineral dispersions, tanning agents for leather, associative thickeners and rheology modifiers for coating compositions, and notably gypsum-containing or cementious slurry.

BRIEF DESCRIPTION OF THE DRAWINGS

FIG. 1 depicts FTIR spectra of two embodiments of the present invention (samples #2 and #3) and of one comparative embodiment (sample #1)

By "(co)polymer," we mean homopolymer or copolymer that is made by the free radical polymerization of two or more monomers.

The addition polymer (a) is formed in the presence of phosphorous-containing chain transfer agents such as, for example, hypophosphorous acid and its salts (e.g., sodium or ammonium hypophosphite), as is disclosed, for example, in U.S. Pat. Nos. 5,077,361, 5,294,686 and 5,294,687 which are hereby incorporated herein by reference. The purpose of employing hypophosphorous acid in the polymerization is two fold. One is to provide phosphinate and phosphonate functionality in the polymer molecule that can later serve to hasten esterification and or amidation with compounds of Formula I, II III or IV. The second contribution arises from its chain transfer activity and is a means to control molecular weight.

Examples of compounds for (b) are alkylpolyalkylene glycols which include but are not limited to methylpolyethylene glycol having a molecular weight of 350, methylpolyethylene glycol having a molecular weight of 500; methylpolyethylene glycol having a molecular weight of 750; methylpolyethylene glycol having a molecular weight of 1000; methylpolyethylene glycol having a molecular weight of 1500; methylpolyethylene glycol having a molecular weight of 2000; methylpolyethylene glycol having a molecular weight of 5000; butylpolyethylene glycol having a molecular weight of 10,000; and isodecylpolyethylene glycol having a molecular weight of 1000.

The alkylpolyalkylene glycols may also comprise propylene oxide or butylene oxide, either alone or in combination with ethylene oxide. The combinations can be blockwise or random.

Examples of such block polymers (b) that can be obtained by initial addition of ethylene oxide onto one mole of methanol and subsequent addition of propylene oxide onto the ethylene oxide adduct are: methylpolyalkylene glycol from 5 mole of ethylene oxide and 1 mole of propylene oxide; methylpolyalkylene glycol from 5 mole of ethylene oxide and 3 mole of propylene oxide; methylpolyalkylene glycol from 5 mole of ethylene oxide and 10 mole of propylene oxide; methylpolyalkylene glycol from 10 mole of ethylene oxide and 1 mole of propylene oxide; methylpolyalkylene glycol from 10 mole of ethylene oxide and 3 mole of propylene oxide; methylpolyalkylene glycol from 10 mole of ethylene oxide and 10 mole of propylene oxide; methylpolyalkylene glycol from 20 mole of ethylene oxide and 1 mole of propylene oxide; methylpolyalkylene glycol from 20 mole of ethylene oxide and 3 mole of propylene oxide; methylpolyalkylene glycol from 20 mole of ethylene oxide and 10 mole of propylene oxide; methylpolyalkylene glycol from 25 mole of ethylene oxide and 1 mole of propylene oxide; butyl alcohol alkoxylate from 25 mole of ethylene oxide and 3 mole of propylene oxide; lauryl alcohol alkoxylate from 25 mole of ethylene oxide and 10 mole of propylene oxide.

It is also possible to use polytetrahydrofuran which bears, for example, a $C_1$-$C_4$-alkyl group as end group at one end and has a molar mass of from 200 to 5000.

The above mentioned alkylpolyalkylene glycols can be aminated, for example by reaction with ammonia at elevated temperatures and under super-atmospheric pressure in the presence of a catalyst, to convert the terminal OH groups into terminal amino groups. This forms, for example, 80-100% of primary amino groups, from 0 to 20% by weight of secondary amino groups and from 0 to 10% by weight of tertiary amino groups.

Alkylpolyalkylene glycol amines of for use as component (b) which are suitable for the reaction with the polymers (a) can also be prepared by addition of alkylpolyalkylene glycols onto the double bond of acrylonitrile and subsequent hydrogenation of the nitrile group to an amino group.

Compounds of the group (b) include, for example: methylpolyethylene glycol amine from 3 ethylene oxide, methylpolyethylene glycol amine from 7 ethylene oxide, methylpolyethylene glycol amine from 10 ethylene oxide, methylpolyethylene glycol amine from 20 ethylene oxide, methylpolyethylene glycol amine from 30 ethylene oxide, methylpolyethylene glycol amine from 50 ethylene oxide, methylpolyethylene glycol amine from 5 ethylene oxide and 1 propylene oxide, methylpolyethylene glycol amine from 10 ethylene oxide and 1 propylene oxide, methylpolyethylene glycol amine from 10 ethylene oxide and 3 propylene oxide, methylpolyethylene glycol amine from 10 ethylene oxide and 10 propylene oxide, methylpolyethylene glycol amine from 20 ethylene oxide and 1 propylene oxide, methylpolyethylene glycol amine from 20 ethylene oxide and 3 propylene oxide, methylpolyethylene glycol amine from 20 ethylene oxide and propylene oxide, methylpolyethylene glycol amine from 30 ethylene oxide and 5 propylene oxide, methylpolyethylene glycol amine from 40 ethylene oxide and 10 propylene oxide, and methylpolyethylene glycol amine from 50 ethylene oxide and 1 propylene oxide.

The mono-end-capped polyethylene glycols of the formulae I and II and the alkylpolyalkylene glycol amines can be used together with ammonia or amines in the preparation of the modified polymers containing acid groups. Suitable amines are, for example, alkylamines having molar masses of up to 2000 or $C_{30}$-dialkylamines having molar masses of up to 5000. Specific examples of such amines are ethylamine, butylamine, hexylamine, octylamine, stearylamine, tallow fatty amine and palmitylamine. It is also possible to use long-chain amines such as polyisobuteneamines having molar masses of, for example, 500, 1000 or 2000. The fatty amines may also be unsaturated, e.g. oleylamine. Examples of further amines are 2-methoxyethylamine, 2-methoxypropylamine, 3-methoxypropylamine, 2-ethoxypropylamine, 3-ethoxypropylamine, 2-(2-methoxyethoxy)propylamine, 3-(2-methoxyethoxy) propylamine. Further possible amines are alkoxylated alkylamines or alkoxylated dialkylamines, for example reaction products of 1 mole of oleylamine with 20 mole of ethylene oxide or reaction products of 1 mole of stearylamine with 1 mole of ethylene oxide and 2 mole of propylene oxide or reaction products of 1 mole of tallow fatty amine with 1 mole of butylene oxide and 5 mole of ethylene oxide. Amino alcohols in combination with, for example, polyalkylene glycols which are end-capped at one end are also suitable for the modification. Examples of such amino alcohols are ethanolamine, diethanolamine N,N-diethylethanolamime and N,N-dimethylethanolamine.

Apart from ammonia and amines, it is also possible to use alcohols in admixture with polyalkylene glycols which are end-capped at one end or alkylpolyalkylene glycol amines for modifying the polymers of component (a).

Suitable alcohols are, for example, $C_1$-$C_{50}$-alcohols. Examples are methanol, ethanol, isopropanol, n-propanol, butanol, hexanol, cyclohexanol, dodecanol, tridecanol, 2-ethylhexyl alcohol, hexadecanol, octadecanol, palmityl alcohol, stearyl alcohol, behenyl alcohol and tallow fatty alcohol. It is also possible to use unsaturated alcohols such as oleyl alcohol. Natural alcohols or alcohols prepared by the Ziegler process or oxo alcohols can be used. The alcohols can be linear or branched.

In place of the alcohols, hydroxycarboxylic acids can also be used in the above-described mixtures. Examples are glycolic acid, lactic acid, citric acid, isocitric acid, tartaric acid and malic acid.

A further group of compounds which can be used together with polyalkylene glycols which are end-capped at one end and/or alkylpolyalkylene glycol amines for modifying the polymers of component (a) are amino acids. Examples of such compounds are glycine, alanine, aspartic acid, glutamic acid, glutamine, lysine, arginine, 4-aminobutyric acid, 6-aminocaproic acid, 11-aminoundecanoic acid and lactams such as caprolactam. Taurine is also suitable.

Examples of reactions of polymers (a) with compounds of the group (b), i.e. the polyalkylene glycols which are end-capped at one end, alkylpolyalkylene glycol amines or mixtures thereof or mixtures of at least one of the two compounds specified with up to 20% by weight, based on the mixtures, of ammonia, amines, alcohols, hydroxycarboxylic acids or aminocarboxylic acids, are: 15% by weight of polyacrylic acid, 80% by weight of methylpolyethylene glycol and 5% by weight of methylpolyethylene glycol amine 30% by weight of polyacrylic acid, 65% by weight of methylpolyethylene glycol and 5% by weight of methylpolyethylene glycol amine 40% by weight of polyacrylic acid, 55% by weight of methylpolyethylene glycol and 5% by weight of methylpolyethylene glycol amine 10% by weight of polyacrylic acid, 70% by weight of methylpolyethylene glycol and 20% by weight of methylpolyethylene glycol amine 15% by weight of polymethacrylic acid, 80% by weight of methylpolyethylene glycol and 5% by weight of methylpolyethylene glycol amine 15% by weight of copolymer of acrylic acid and methacrylic acid, 80% by weight of methylpolyethylene glycol and 5% by weight of methylpolyethylene glycol amine 15% by weight of copolymer of acrylic acid and maleic acid, 80% by weight of methylpolyethylene glycol and 5% by weight of methylpolyethylene glycol amine 10% by weight of polyacrylic acid and 90% by weight of methylpolyethylene glycol 15% by weight of copolymer of methacrylic acid and maleic acid, 80% by weight of methylpolyethylene glycol and 5% by weight of methylpolyethylene glycol amine 20% by weight of polyacrylic acid and 80% by weight of methylpolyethylene glycol 30% by weight of polyacrylic acid and 70% by weight of methylpolyethylene glycol 40% by weight of polyacrylic acid and 60% by weight of methylpolyethylene glycol.

It is also possible to use two or more alkylpolyalkylene glycols of group (b) for the reaction with one or more of the polycarboxylic acids of group (a), for example: 10% by weight of polyacrylic acid, 45% by weight of methylpolyethylene glycol having a molar mass of 500 and 45% by weight of methylpolyethylene glycol having a molar mass of 2000 20% by weight of polymethacrylic acid, 30% by weight of methylpolyethylene glycol having a molar mass of 500 and 50% by weight of methylpolyethylene glycol having a molar mass of 1000 30% by weight of polyacrylic acid, 20% by weight of methylpolyethylene glycol having a molar mass of 300 and 50% by weight of methylpolyethylene glycol having a molar mass of 4000 40% by weight of polyacrylic acid, 10% by weight of methylpolyethylene glycol having a molar mass of 500 and 50% by weight of methylpolyethylene glycol having a molar mass of 2000 20% by weight of polymethacrylic acid, 30% by weight of methylpolyethylene glycol having a molar mass of 1000 and 50% by weight of methylpolyethylene glycol having a molar mass of 5000 20% by weight of copolymer of acrylic acid and methacrylic acid in a weight ratio of 1:1, 30% by weight of methylpolyethylene glycol having a molar mass of 500 and 50% by weight of methylpolyethylene glycol having a molar mass of 1000 20% by weight of copolymer of acrylic acid and methacrylic acid in a weight ratio of 1:9, 60% by weight of methylpolyethylene glycol having a molar mass of 500 and 20% by weight of methylpolyethylene glycol having a molar mass of 1000 20% by weight of copolymer of acrylic acid and maleic acid in a weight ratio of 3:7, 50% by weight of methylpolyethylene glycol having a molar mass of 500 and 30% by weight of methylpolyethylene glycol having a molar mass of 2000 10% by weight of polyacrylic acid, 10% by weight of copolymer of acrylic acid and methacrylic acid in a weight ratio of 3:7, 50% by weight of methylpolyethylene glycol having a molar mass of 500 and 30% by weight of methylpolyethylene glycol having a molar mass of 2000 20% by weight of polymethacrylic acid, 10% by weight of copolymer of acrylic acid and methacrylic acid in a weight ratio of 7:3, 30% by weight of methylpolyethylene glycol having a molar mass of 500 and 50% by weight of methylpolyethylene glycol having a molar mass of 2000 10% by weight of polyacrylic acid and 90% by weight of methylpolyethylene glycol amine 20% by weight of polyacrylic acid and 80% by weight of methylpolyethylene glycol amine 30% by weight of polyacrylic acid and 70% by weight of methylpolyethylene glycol amine 40% by weight of polyacrylic acid and 60% by weight of methylpolyethylene glycol amine 20% by weight of polyacrylic acid, 74% by weight of methylpolyethylene glycol, 5% by weight of methylpolyethylene glycol amine and 1% by weight of ammonia 20% by weight of polyacrylic acid, 75% by weight of methylpolyethylene glycol, 5% by weight of 2-methoxyethylamine 20% by weight of polyacrylic acid, 75% by weight of methylpolyethylene glycol, 5% by weight of 2-methoxypropylamine 15% by weight of polyacrylic acid, 80% by weight of methylpolyethylene glycol, 5% by weight of 2-methoxypropylamine 15% by weight of polyacrylic acid, 80% by weight of methylpolyethylene glycol, 5% by weight of 3-methoxypropylenamine 20% by weight of polyacrylic acid, 70% by weight of methylpolyethylene glycol, 10% by weight of 3-(2-methoxyethoxy)propylamine and 20% by weight of polyacrylic acid, 70% by weight of methylpolyethylene glycol, 10% by weight of 2-(2-methoxyethoxy)propylamine, 40% by weight polyacrylic acid, 50% by weight methylpolyethylene glycol and 10% by weight N,N-dimethylethanolamine The molar masses of the polymers (a) and the polyalkylene glycols which are end-capped at one end or alkylpolyalkylene glycol amines (b) mentioned above by way of example are in the range indicated above for the compounds (a) and (b).

The weight ratio in which the compounds of groups (a) and (b) are reacted can be from 99:1 to 1:99. The components (a) and (b) are preferably reacted in a weight ratio of from 50:50 to 5:95, particularly preferably from 30:70 to 10:90.

The reaction is carried out, for example, by admixing the aqueous solutions of the component (a) with, if desired, an acid acting as catalyst and neutralizer of part or all of the polycarboxy polymer of group (a) with a compound of the component (b) and distilling off the water. The water is usually distilled from the mixture under atmospheric pressure, but can also be carried out under reduced pressure. It is often advantageous to pass a stream of gas through the reaction mixture during the distillation in order to remove the water and other volatile constituents more quickly. As stream of gas, it is possible to use air, nitrogen or steam. However, it is also possible for the water to be removed under reduced pressure and for a stream of gas to be passed through the reaction mixture in addition. To distill the water from the reaction mixture, energy has to be supplied to the mixture. Suitable apparatuses for this purpose are heatable stirred vessels, stirred vessels with external heat exchangers, stirred vessels with internal heat exchangers, thin film evaporators, kneaders and extruders. The water which vaporizes is taken from the reaction medium via a vapor line and is condensed in a heat exchanger. It contains only small amounts of organic constituents and can be disposed of via a water treatment plant.

Subsequent to or simultaneously with the removal of water from the reaction mixture, a condensation reaction between the compounds of the components (a) and (b) occurs. The water formed in this condensation reaction is likewise removed from the reaction medium. The modification of the compound of component (a) is carried out at, for example, from 100 to 250° C. This temperature depends on the reaction apparatus and the residence time. If, for example, the condensation is carried out in a continuously operated extruder or thin film evaporator in which the residence time is only a few seconds or minutes, it is advantageous to employ temperatures in the range from 150 to 250° C. In batchwise operation in stirred vessels or kneaders, the residence time required is, for example, 1-15 hours and the condensation is usually carried out in the temperature range of 100-200° C.

In one process variant, the polymers (a) containing acid groups can be dewatered first and the resulting powder or granulated material can be condensed with at least one compound of component (b).

After the condensation, the reaction mixture is cooled and, if appropriate, dissolved in water. Aqueous solutions of the reaction mixture can be prepared, for example, by adding water to the reaction mixture still at 50-150° C. while stirring or by stirring the liquid reaction mixture at 50-150° C. into water. It is usual to employ such an amount of water that a 20-95% strength by weight, preferably 30-50% strength by weight, aqueous solution of the modification product is obtained. Simultaneously with or subsequent to the dissolution of the condensation product, neutralization of the remaining acid groups can be carried out if desired. As neutralization agents, use is made of alkali metal or alkaline earth metal oxides or hydroxides in solid form or in the form of 10-50% strength aqueous solutions or slurries in water. Examples of suitable bases are lithium hydroxide, sodium hydroxide, potassium hydroxide, calcium oxide, calcium hydroxide, magnesium oxide, magnesium hydroxide, aluminum oxide and aluminum hydroxide. Depending on the degree of neutralization, the aqueous solutions of the modified polycarboxylic acids can have pH values in the range from 1 to 7.

The reaction mixture can also remain undiluted after the condensation. On cooling to below 60° C., it crystallizes to a waxy mass which can readily be melted again. This results in varying possibilities for transport. For example, the reaction mixture can be packed in drums from which the condensation product can be melted again. It can also be transported and stored in the molten state at above 60° C., preferably at from 80 to 120° C. Heatable and thermally insulated tankers are suitable for this. The melt can be stored in heated storage containers at from 80 to 120° C. However, it is also possible to prepare a 60-90% strength aqueous solution and to handle this. The viscosities of such solutions are, for example, from 1000 to 100,000 mPas. Addition of from 1 to 40% by weight of water to the melt can reduce the softening temperature. Thus, a condensation product without water melts, for example, at 50° C., with 5% of water at 45° C. and with 10% of water at only 30° C. Addition of 20-40% by weight of water allows the solutions to be readily handled at 20-40° C. This plasticizing action of the water can be advantageous for handling of the melt, since it can reduce the storage temperature and the melt viscosity is also lowered.

The water-free melt can also be mixed with inert powders so as to obtain free-flowing granular material. Inert powders which can be used are, for example, kieselguhr, silica gel, amorphous silicic acid and/or amorphous silicon dioxide.

The aqueous polymer solutions of the modified polymers containing acid groups which can be obtained in this way are used, for example, as dispersants for cement.

Preferably, the reaction of (a) and (b) is conducted in the presence of a strong acid, preferably a mineral acid (e.g., phosphoric acid, phosphorous acid, nitric acid and most preferably sulfuric acid). Alternatively, sulfonated organic acids can be used such as p-toluenesulfonic acid or a latent acid such as ammonium sulfate, ammonium dihydrogen sulfate, ammonium dihydrogen phosphate, diammonium hydrogen phosphate or ammonium p-tolunesulfonate. Preferably the reaction of (a) and (b) is conducted in the presence of a defoamer.

The following examples illustrate specific ways of practicing this invention

Experimental Procedure

Materials:
Poly(ethyleneglycol)mono methylether: (Mw 350, PEG350Me), Acros Organics
2-dimethylaminoethanol: (DMAE): Aldrich
Sulfuric acid (98%): $H_2SO_4$, Fisher Scientific
Sodium Hypophosphite (45%): NaHP 45%, Rhodia Sample 1 was prepared by mixing 16.0 g of stirred SOKALAN PA25 CL, "p-AA I", available from BASF Corporation and measured to be at 50.4% solids and pH 3.6, 5.2 grams of water, followed by 0.4 g. of 98% sulfuric acid (Fisher Scientific) and 10.0 g. polyethylene glycol 350 mono methylether (Acros Organics) and 1.4 g. of 2-dimethylaminoethanol (Aldrich). The solution was well mixed, then used directly for further FT-IR analysis.

Sample 2 was prepared in the same manner as sample 1 except p-AA (1) was replaced with Acumer™4161, p-AA (II), a phosphinopolycarboxylic acid (PCA) sold by the Rohm and Haas Company.

Sample 3 was prepared in a similar fashion as Sample 1

TABLE 1

Esterification Samples

| Sample 1 | | Sample 2 | | Sample 3 | |
|---|---|---|---|---|---|
| RMs | Amount | RMs | Amount | RMs | Amount |
| p-AA (1) | 16.0 | p-AA (II) | 16.0 | p-AA (I) | 16.0 |
| PEG350Me | 10.0 | PEG350Me | 10.0 | PEG350Me | 10.0 |
| DMAE | 1.4 | DMAE | 1.4 | DMAE | 1.4 |
| H2SO4 | 0.4 | H2SO4 | 0.4 | H2SO4 | 0.4 |
| Water | 5.2 | Water | 5.2 | Water | 4.4 |
| | | | | NaHP (45%) | 2.2 |

Copolymer Esterification:

Copolymer of acrylic acid and 2-acrylamido-2-methylpropane sulfonic acid (AMPS®, Lubrizol 2404, Lubrizol Corporation), sodium salt (Lubrizol 2405, Lubrizol Corporation) prepared by bisulfite chain transfer polymerization and sodium hypophosphite chain transfer polymerization, Acumer™2000 (Rohm and Haas Company) and Belclene™400 (BWA Water Additives), respectively were obtained, formulated and esterified in a similar manner, as described in Table 2.

TABLE 2

Esterification of AA-AMPS ® Copolymers: With and Without NaHP

| Sample 4 | | Sample 5 | | Sample 6 | |
|---|---|---|---|---|---|
| RMs | Amount | RMs | Amount | RMs | Amount |
| Acumer2000 (1) | 16.0 | Belclene 400 (2) | 16.0 | Acumer2000 | 16.0 |
| PEG350Me | 10.0 | PEG350Me | 10.0 | PEG350Me | 10.0 |
| DMAE | 1.4 | DMAE | 1.4 | DMAE | 1.4 |
| H2SO4 | 0.6 | H2SO4 | 0.4 | H2SO4 | 0.4 |
| Water | 4.4 | Water | 5.2 | Water | 3.6 |
| | | | | NaHP (45%) | 2.2 |

(1) measured to be at 45% solids and pH 3.9
(2) measured to be at 50% solids and pH 2.7

The rate of esterification of samples 1-3 were examined using by FTIR (FIG. 1) FTIR experimental method: FTIR spectra were measured by transmission using a Thermo Nicolet™6700 FTIR spectrometer with 4 cm-1 resolution, 16 scans, Happ-Genzel apodization and no zero-filling. A thin film of each solution (1,2,3) was cast onto a AgCl plate and allowed to dry to a film with thickness of approximately 5 μm. Spectra were measured after briefly drying with nitrogen at room temperature, and then placing in an oven at 160° C. for 60 minutes.

FTIR spectral interpretation: FIG. 1 shows the spectra of the three samples in the carbonyl region after cure at 160° C. for 60 minutes. Sample 1, which does not contain NaHP, shows larger peaks at 1765 and 1801 cm-1, assigned to cyclic anhydride with a 6-membered ring, and also a larger peak at 1707 cm-1, assigned to carboxylic acid with a hydrogen-bonded carbonyl group. These spectral features all indicate a lower degree of conversion of acid to ester. As the conversion to ester increases, the amount of carboxylic acid decreases. The probability of two adjacent carboxylic acid groups on the polymer chain therefore decreases, which reduces the amount of cyclic anhydride formed. The spectral data in FIG. 1 indicates that after 1 hour at 160 C. Samples 2 and 3 have a higher conversion to ester compared to Sample 1.

FTIR is sensitive to the degree of esterification based on the carboxylic acid peak at 1707 cm-1 and the anhydride peaks at 1763 and 1801 $cm^{-1}$. The reaction can be consistently run to the desired extent of partial completion by terminating the manufacturing process when the intensity at these frequencies relative to the dominant carbonyl peak at 1734 cm-1 reaches the desired level (based on applications performance of the product). A relative indicator of the amount of unreacted carboxylic acid is calculated from the absorbance spectrum based on the ratio of calculated intensities:

Index=(Absorbance 1707 cm-1)/(Absorbance 1734 cm-1).

We claim:

1. A process for modifying a (co)polymer (a) containing acid groups comprising reacting (a) with (b)
   wherein (a) is selected from one or more (co)polymer comprising at least 5% by weight of a (co)polymerized monoethylenically unsaturated monomer containing acid groups and having a weight average molecular weight from 1000 to 200,000, and
   (b) is selected from one or more compounds of formula I, II, III or IV

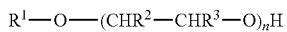    I
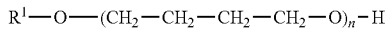    II
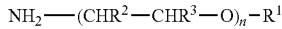    III
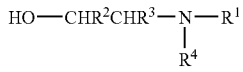    IV wherein $R^1$ is selected from $C_1$-$C_{50}$ alkyl; $R^2$ and $R^3$ are independently selected from H, methyl or ethyl; and $R^4$ is independently selected from $C_1$-$C_{50}$ alkyl, hydroxyethyl, acetoxyethyl, hydroxy-isopropyl, or acetoxy-isopropyl; and
   n is an integer from 1-230;

wherein the reaction of (a) and (b) is conducted at up to 250° C., and wherein (1) the (co)polymer(s) used as component (a) are obtained by free-radical polymerization of monoethylenically unsaturated acids in aqueous solution in the presence or absence of other monoethylenically unsaturated monomers and in the presence of at least 2% by weight, based on the monomers used in the polymerization, of a hypophosphite-containing chain transfer agent; or (2) wherein the reaction of (a) and (b) is chosen from esterification and amidation of (a) with (b) and, further wherein, the mixture of (a) and (b) comprises as an esterification or amidation catalyst a hypophosphorous acid or salt(s) thereof.

2. A process as claimed in claim 1, wherein the phosphorous-containing chain transfer agent is hypophosphorous acid or one or more of its salts, or a mixture thereof.

3. A process as claimed in claim 1, wherein the phosphorous-containing chain transfer agent is used in an amount of from 4 to 20% by weight, based on the monomers used in the polymerization of (a).

4. A process as claimed in claim 1, wherein (a) is selected from one or more homopolymers or copolymers of acrylic acid, methacrylic acid, maleic acid, itaconic acid, styrenesulfonic acid, 2-phosphoethylmethacrylate, maleic anhydride, vinylsulfonic acid, 2-acrylamido-2-methyl-propanesulfonic acid, methallylsulfonic acid or alkali metal or ammonium salts of such monomers.

5. The process as claimed in claim 1 wherein after (a) and (b) are reacted, water is added, and (a) and (b) has been reacted in proportion such that after the reaction has ended, the reaction product after water is added has a measurable amount of un-reacted acid groups remaining from (a).

6. A process as claimed in claim 1, wherein (a) is selected from homopolymers of acrylic acid, homopolymers of methacrylic acid, copolymers of acrylic acid and methacrylic acid, copolymers of methacrylic acid and vinylsulfonic acid, copolymers of acrylic acid and maleic acid, copolymers of methacrylic acid and maleic acid, copolymers of acrylic acid and an ester of a monoethylenically unsaturated carboxylic acid, copolymers of methacrylic acid and an ester of a monoethylenically unsaturated carboxylic acid and/or alkali metal or ammonium salts of the copolymers specified.

7. A process as claimed in claim 1, wherein the weight average molecular weight of (a) is from 2000 to 20,000.

8. A process as claimed in claim 1, wherein (a) used comprises homopolymers of acrylic acid or methacrylic acid or copolymers of methacrylic acid and acrylic acid and acrylic acid and maleic acid or partial salts thereof.

9. A process as claimed in claim 1, wherein (b) is selected from methylpolyethylene glycols or methylpolyalkylene glycols comprising ethylene oxide and propylene oxide, in each case having number average molecular weights of from 200 to 10,000, or N, N-dialkylalkanolamine.

* * * * *